United States Patent [19]

Klusener et al.

[11] Patent Number: 5,266,545
[45] Date of Patent: Nov. 30, 1993

[54] CATALYST COMPOSITIONS

[75] Inventors: Peter A. A. Klusener; Johannes J. M. Snel, both of Amsterdam, Netherlands

[73] Assignee: Shell Oil Company, Houston, Tex.

[21] Appl. No.: 6,577

[22] Filed: Jan. 21, 1993

Related U.S. Application Data

[62] Division of Ser. No. 914,235, Jul. 13, 1992, Pat. No. 5,216,119.

[30] Foreign Application Priority Data

Dec. 3, 1990 [NL] Netherlands .......................... 9002645

[51] Int. Cl.$^5$ .............................................. B01J 31/00
[52] U.S. Cl. ................................... 502/166; 502/162; 502/167; 502/170
[58] Field of Search ................ 502/162, 166, 167, 170

[56] References Cited

U.S. PATENT DOCUMENTS 5,177,044  1/1993  van Doorn et al. ................ 502/167

Primary Examiner—Patrick P. Garvin
Assistant Examiner—Brent M. Peebles
Attorney, Agent, or Firm—James O. Okorafor

[57] ABSTRACT

A catalyst composition useful in the preparation of a polymer composition includes a Group VIII metal and a phosphorus bidentate ligand of the general formula $(R_2)(R_4)P-R_3-P(R_2)(R_4)$ wherein $R_2$ and $R_4$ are optionally polar substituted alkyl groups, differing from each other in carbon number, and wherein $R_3$ is a divalent organic bridging group which contains four atoms. Such catalyst compositions are particularly useful for preparing copolymers of carbon monoxide with $\alpha$-olefins having at least three carbon atoms.

12 Claims, No Drawings

CATALYST COMPOSITIONS

This is a division, of application Ser. No. 07/914,235, filed Jul. 13, 1992, now U.S. Pat. No. 5,216,119.

TECHNICAL FIELD

The invention relates to novel catalyst compositions suitable for use in the preparation of polymers of carbon monoxide with one or more mono-olefins.

BACKGROUND OF THE INVENTION

Linear polymers of carbon monoxide with ethene, in which polymers the units from carbon monoxide, and the units from ethene are present in a substantially alternating arrangement can be prepared by contacting the monomers at elevated temperature and pressure with a catalyst composition containing a Group VIII metal and a phosphorus bidentate ligand of the general formula $(R_1)_2P-R-P(R_1)_2$ in which $R_1$ represents an optionally polar substituted monovalent aromatic hydrocarbon group and R is a divalent organic bridging group. In regard to this bridging group, there is preference for a group which in the bridge connecting the two phosphorus atoms with each other contains three atoms, of which at least two are carbon atoms and among which no two atoms are present which together form part of a single cyclic structure. It has been found that phosphorus bidentate ligands in which such a bridge occurs give the catalyst compositions the highest polymerization rate. An example of such a phosphorus bidentate ligand is 1,3-bis(diphenylphosphino)propane.

A drawback of the alternating carbon monoxide/ethene copolymers is that they have a very high melting point. The processing of these polymers should take place in the molten state with the material being processed at a temperature which is at least 25° C. above the melting point. It has been found that these polymers are not particularly resistant to the high temperatures required in their processing and, as a result, discoloration and decomposition can take place. Previously it has been found that the melting point of these polymers could be considerably reduced by incorporating in the starting monomer mixture a relatively small quantity of one or more α-olefins with at least three carbon atoms per molecule (hereinafter designated as $C_{3+}$ α-olefins). The more $C_{3+}$ α-olefins incorporated in the monomer mixture, the lower the melting point of the polymers obtained. It was also found that the previously mentioned catalyst compositions containing phosphorus bidentate ligand with three atoms in the bridge which exhibited the highest polymerization rate in the polymerization of carbon monoxide with ethene also afforded the highest polymerization rate in the polymerization of carbon monoxide with ethene and additionally one or more $C_{3+}$ α-olefins.

The applicants recently carried out an investigation in order to find out whether, with the use of the above-mentioned catalyst compositions, linear polymers of carbon monoxide with one or more $C_{3+}$ α-olefins (i.e. without ethene) could be prepared in which the units from carbon monoxide on the one hand and the units from the $C_{3+}$ α-olefins used on the other hand occurred in a substantially alternating manner. It was found that such polymers could indeed be prepared in this way, but that the catalyst compositions exhibited only a low polymerization rate in comparison with their previously observed rate in the polymerization of carbon monoxide with ethene and optionally also with one or more $C_{3+}$ α-olefins. Consistent with previous observations in the polymerization of carbon monoxide with ethene, alone or in admixture with one or more $C_{3+}$ α-olefins, the highest polymerization rates in the polymerization of carbon monoxide with one or more $C_{3+}$ α-olefins were obtained using catalyst compositions containing a phosphorus bidentate ligand with three atoms in the bridge. In the course of continued research by the applicants into this subject, it was found that the rate of polymerization of carbon monoxide with one or more $C_{3+}$ α-olefins could be increased if the catalyst composition was modified by replacing the optionally polar substituted monovalent aromatic $R_1$ hydrocarbon groups in the phosphorus bidentate ligand by optionally polar substituted monovalent aliphatic $R_2$ hydrocarbon groups. In this modified catalyst composition, the applicants mainly used phosphorus bidentate ligands in which the bridge contained three atoms, since from previous work (see above), it was assumed that this would enable the highest polymerization rate to be achieved with these catalyst compositions. An example of a phosphorus bidentate ligand of this type with the general formula $(R_2)_2P-R-P(R_2)_2$ is 1,3-bis(di-n-butylphosphino)propane.

In the subsequent research into this subject, it has now been surprisingly found that the polymerization rate of the last-mentioned catalyst compositions for the polymerization of carbon monoxide with one or more $C_{3+}$ α-olefins can be raised by replacing the bridging group R in the phosphorus bidentate ligand with a divalent organic bridging group $R_3$ which contains in the bridge linking the two phosphorus atoms with each other, four atoms, of which at least two are carbon atoms and among which no two atoms are present which together form part of a single cyclic structure. It was further found that an increase of the polymerization rate of the catalyst compositions obtained by replacing therein a phosphorus bidentate ligand with the general formula $(R_2)_2P-R-P(R_2)_2$ by a phosphorus bidentate ligand with the general formula $(R_2)_2P-R_3-P(R_2)_2$ also occurs in the polymerization of carbon monoxide with ethene in admixture with one or more $C_{3+}$ α-olefins. In complete contrast with this it has been found that a replacement of this kind in the polymerization of carbon monoxide with ethene leads to a decrease in the polymerization rate. Finally it was found that the polymerization rate of catalyst compositions containing a phosphorus bidentate ligand with the general formula $(R_2)_2P-R_3-P(R_2)_2$ in the polymerization of carbon monoxide with one or more $C_{3+}$ α-olefins and optionally also with ethene can be raised further by replacing therein, at each of the two phosphorus atoms, one of the $R_2$ groups by an optionally polar substituted aliphatic hydrocarbon group differing in carbon number from $R_2$. Corresponding with the previously observed deviant behavior of the catalyst compositions containing a phosphorus bidentate ligand with the general formula $(R_2)_2P-R_3-P(R_2)_2$ in the polymerization of carbon monoxide with ethene, it was now also found in this polymerization that a replacement of this kind led to a decrease in the polymerization rate. Evidently, the favorable effects on the polymerization rate obtained with the above-described modifications of the phosphorus bidentate ligand are only obtained if the catalyst composition is used for polymerizing a monomer mixture containing $C_{3+}$ α-olefins.

SUMMARY OF THE INVENTION

Catalyst compositions containing a Group VIII metal and a phosphorus bidentate ligand with the general formula $(R_2)(R_4)P-R_3-P(R_2)(R_4)$ in which $R_2$ and $R_4$ are identical or different optionally polar substituted monovalent aliphatic hydrocarbon groups and in which $R_3$ is a divalent organic bridging group which in the bridge connecting the two phosphorus atoms with each other contains four atoms, of which at least two are carbon atoms and among which no two atoms are present which together form part of a single cyclic structure, are novel.

DETAILED DESCRIPTION OF THE INVENTION

The present invention therefore relates to novel catalyst compositions which contain a Group VIII metal and a phosphorus bidentate ligand with the general formula $(R_2)(R_4)P-R_3-P(R_2)(R_4)$ wherein $R_2$ and $R_4$ are identical or different optionally polar substituted monovalent aliphatic hydrocarbon groups and in which $R_3$ is a divalent organic bridging group which in the bridge connecting the two phosphorus atoms with each other contains four atoms of which at least two are carbon atoms and among which no two atoms are present which together form part of a single cyclic structure. The patent application further relates to the application of these catalyst compositions in the preparation of polymers of carbon monoxide with one or more $C_{3+}$ α-olefins and optionally also with ethene, as well as to the polymers thus prepared and to shaped objects consisting at least partly of these polymers.

In this patent application, Group VIII metals are understood to be the noble metals ruthenium, rhodium, palladium, osmium, iridium and platinum, as well as the iron group metals iron, cobalt and nickel.

In the catalyst compositions according to the invention the Group VIII metal is preferably chosen from palladium, nickel and cobalt. Palladium is particularly preferred as Group VIII metal. The incorporation of the Group VIII metal in the catalyst compositions preferably takes place in the form of a salt of a carboxylic acid, in particular in the form of an acetate. In addition to a Group VIII metal and a phosphorus bidentate ligand, the catalyst compositions according to the invention preferably also contain an anion of an acid with a pKa of less than 4 and in particular an anion of an acid with a pKa of less than 2. Examples of acids with a pKa of less than 2 are mineral acids such as sulfuric acid and perchloric acid, sulfonic acids such as methanesulfonic acid, trifluoromethanesulfonic acid and para-toluenesulfonic acid, and halocarboxylic acids such as trichloroacetic acid, difluoroacetic acid and trifluoroacetic acid. A sulfonic acid such as para-toluenesulfonic acid or a halocarboxylic acid such as trifluoroacetic acid is preferred. The anion can be introduced into the catalyst compositions either in the form of a compound from which the desired anion is generated or in the form of a mixture of compounds from which the desired anion is formed by mutual reaction. As a rule, the anion is incorporated in the catalyst compositions in the form of an acid. If desired, the anion can also be included in the catalyst composition in the form of a non-noble transition metal salt of the acid in question. If an anion of a carboxylic acid is chosen, its incorporation in the catalyst composition can take place in the form of the acid or in the form of a derivative thereof, such as an alkyl or aryl ester, an amide, an imide, an anhydride, an orthoester, a lactone, a lactam or an alkylidene dicarboxylate. The anion is preferably present in the catalyst compositions in a quantity of 1–100 and in particular 2–50 mol per g.atom Group VIII metal. As well as by its introduction as a separate component, the anion of an acid with a pKa of less than 4 can also be present in the catalyst compositions by the use of, for example, palladium trifluoroacetate or palladium para-tosylate as Group VIII metal compound.

In addition to a Group VIII metal, a phosphorus bidentate ligand and optionally an anion of an acid with a pKa of less than 4, the catalyst compositions according to the invention can also contain an organic oxidizing agent. Examples of suitable organic oxidizing agents are 1,2- and 1,4-quinones, aliphatic nitrites such as butyl nitrite and aromatic nitro compounds such as nitrobenzene and 2,4-dinitrotoluene. 1,4-benzoquinone and 1,4-naphthoquinone are preferred. The quantity of organic oxidizing agent employed is preferably 5–5000 and in particular 10–1000 mol per g.atom Group VIII metal.

In the catalyst compositions according to the invention the phosphorus bidentate ligand is preferably present in a quantity of 0.5–2 and in particular 0.75–1.5 mol per g.atom Group VIII metal. In the phosphorus bidentate ligands with the general formula $(R_2)(R_4)P-R_3-P(R_2)(R_4)$ the $R_3$ bridging group should contain, in the bridge connecting the two phosphorus atoms with each other, four atoms, of which at least two are carbon atoms. An example of a very suitable bridging group is the $-CH_2-CH_2-CH_2-CH_2-$ group. In the phosphorus bidentate ligands the $R_2$ and $R_4$ groups preferably each contain not more than 10 carbon atoms. As has been explained above, phosphorus bidentate ligands can be used in the catalyst compositions according to the invention in which the $R_2$ and $R_4$ groups are identical to each other. Favorable results were obtained according to the invention by using catalyst compositions containing a phosphorus bidentate ligand in which the $R_2$ and $R_4$ groups were identical alkyl groups, such as 1,4-bis-(di-n-butylphosphino)butane. There is preference for the use of phosphorus bidentate ligands in which the $R_2$ and $R_4$ groups differ from each other in carbon number. Very favorable results were obtained according to the invention by using catalyst compositions containing a phosphorus bidentate ligand in which the $R_2$ and $R_4$ groups were alkyl groups differing from each other in carbon number, one of which being a methyl group, such as 1,4-bis(methyl, n-butylphosphino)butane.

The polymerization according to the invention is preferably carried out by contacting the monomers with a solution of the catalyst composition in a diluent in which the polymers are insoluble or almost insoluble. Lower alcohols such as methanol are very suitable as diluent. If desired, the polymerization can also be carried out in the gas phase.

As regards the $C_{3+}$ α-olefins used in the polymer preparation according to the invention, there is preference for α-olefins with a maximum of 10 carbon atoms per molecule. There is further preference for the use of monomer mixtures in which besides carbon monoxide and optionally ethene only one $C_{3+}$ α-olefin is present. Examples of suitable $C_{3+}$ α-olefins are propene, pentene-1 and 4-methylpentene-1. The process according to the invention is particularly very suitable for the preparation of copolymers of carbon monoxide with propene and for the preparation of terpolymers of carbon monoxide with ethene and with propene.

The quantity of catalyst composition used in the preparation of the polymers can vary within wide limits. Per mol of olefin to be polymerized, a quantity of catalyst composition is preferably used which contains $10^{-7}$–$10^{-3}$ and in particular $10^{-6}$–$10^{-4}$ g.atom Group VIII metal.

The preparation of the polymers is preferably carried out at a temperature of 25°–150° C. and a pressure of 2–150 bar and in particular at a temperature of 30°–130° C. and a pressure of 5–100 bar.

The ranges and limitations provided in the instant specification and claims are those which are believed to particularly point out and distinctly claim the instant invention. It is, however, understood that other ranges and limitations that perform substantially the same function in substantially the same result are intended to be within the scope of the instant invention as defined by the instant specification and claims.

EXAMPLES

The invention will be described by the following examples which are provided for illustrative purposes and are not to be construed as limiting the invention.

EXAMPLE 1

A carbon monoxide/ethene copolymer was prepared as follows. Into a stirred autoclave with a volume of 100 ml, from which air had been driven by purging with nitrogen, a catalyst solution was introduced consisting of:
40 ml methanol,
0.05 mmol palladium acetate,
0.055 mmol 1,3-bis(diphenylphosphino)propane, and
0.1 mmol para-toluenesulfonic acid.

After forcing in a 1:1 carbon monoxide/ethene mixture to a pressure of 40 bar, the contents of the autoclave were heated to 90° C. During the polymerization the pressure was kept constant by forcing in a 1:1 carbon monoxide/ethene mixture. After 1 hour the polymerization was terminated by cooling the reaction mixture to room temperature and releasing the pressure. The polymer was filtered off, washed with methanol and dried.

17.7 g copolymer was obtained. The polymerization rate was 3300 g copolymer/(g palladium.hour).

EXAMPLE 2

A carbon monoxide/ethene copolymer was prepared in substantially the same way as in Example 1, but with the difference that the catalyst solution contained 1,4-bis(diphenylphosphino)butane instead of 1,3-bis(diphenylphosphino)propane.

13.3 g copolymer was obtained. The polymerization rate was 2480 g copolymer/(g palladium.hour).

EXAMPLE 3

A carbon monoxide/ethene copolymer was prepared in substantially the same way as in example 1, but with the difference that the catalyst solution contained 1,3-bis(di n-butylphosphino)propane instead of 1,3-bis(di-n-butylphosphino)butane.

5.4 g copolymer was obtained. The polymerization rate was 1010 g copolymer/(g palladium.hour).

EXAMPLE 4

A carbon monoxide/ethene copolymer was prepared in substantially the same way as in example 1, but with the difference that the catalyst solution contained 1,4-bis(di-n-butylphosphino)butane instead of 1,3-bis(diphenylphosphino)propane.

4.0 g copolymer was obtained. The polymerization rate was 750 g copolymer/(g palladium.hour).

EXAMPLE 5

A carbon monoxide/ethene copolymer was prepared in substantially the same way as in example 1, but with the difference that the catalyst solution contained 1,4-bis(methyl, n-butylphosphino)butane instead of 1,3-bis(diphenylphosphino)propane.

1.8 g copolymer was obtained. The polymerization rate was 330 g copolymer/(g palladium.hour).

EXAMPLE 6

A carbon monoxide/ethene/propene terpolymer was prepared as follows. Into a stirred autoclave with a volume of 100 ml from which air had been driven by purging with nitrogen a catalyst solution was introduced consisting of:
40 ml methanol,
0.05 mmol palladium acetate,
0.055 mmol 1,3-bis(diphenylphosphino)propane, and
0.1 mmol paratoluenesulfonic acid.

After adding 9.3 g propene, the temperature was raised to 90° C., after which a 1:1 carbon monoxide/ethene mixture was forced in until a pressure of 40 bar was reached. During the polymerization the pressure was kept constant by forcing in a 1:1 carbon monoxide/ethene mixture. After 1 hour the polymerization was terminated by cooling the reaction mixture to room temperature and releasing the pressure. The polymer was filtered off, washed with methanol and dried.

13.9 g terpolymer was obtained. The polymerization rate was 2590 g terpolymer/(g palladium.hour).

EXAMPLE 7

A carbon monoxide/ethene/propene terpolymer was prepared in substantially the same way as in example 6, but with the following differences:
a) the catalyst solution contained 1,4-bis(diphenylphosphino)butane instead of 1,3-bis(diphenylphosphino)propane, and
b) 10.3 g propene was introduced into the autoclave instead of 9.3 g.

6.1 g terpolymer was obtained. The polymerization rate was 1140 g terpolymer/(g palladium.hour).

EXAMPLE 8

A carbon monoxide/ethene/propene terpolymer was prepared in substantially the same way as in example 6, but with the following differences:
a) 10.5 g propene was introduced into the autoclave instead of 9.3 g, and
b) the gas mixture was forced in until a pressure of 55 bar was obtained instead of 40 bar.

29.4 g terpolymer was obtained. The polymerization rate was 5480 g terpolymer/(g palladium.hour).

EXAMPLE 9

A carbon monoxide/ethene/propene terpolymer was prepared in substantially the same way as in example 6, but with the following differences:
a) the catalyst solution contained 1,4-bis(diphenylphosphino)butane instead of 1,3-bis(diphenylphosphino)propane,
b) 10.2 g propene was introduced into the autoclave instead of 9.3 g, and c) the gas mixture was forced in until a pressure of 55 bar was obtained instead of 40 bar.

17.2 g terpolymer was obtained. The polymerization rate was 3200 g terpolymer/(g palladium.hour).

EXAMPLE 10

A carbon monoxide/ethene/propene terpolymer was prepared in substantially the same way as in example 6, but with the following differences:
a) the catalyst solution contained 1,3-bis(di-n-butylphosphino)propane instead of 1,3-bis(diphenylphosphino)propane,
b) 11.5 g propene was introduced into the autoclave instead of 9.3 g, and
c) the reaction time was 1.5 hours instead of 1 hour.

1.2 g terpolymer was obtained. The polymerization rate was 150 g terpolymer/(g palladium.hour).

EXAMPLE 11

A carbon monoxide/ethene/propene terpolymer was prepared in substantially the same way as in example 6, but with the following differences:
a) the catalyst solution contained 1,4-bis(di-n-butylphosphino)butane instead of 1,3-bis(diphenylphosphino)propane,
b) 10.0 g propene was introduced into the autoclave instead of 9.3 g.

4.7 g terpolymer was obtained. The polymerization rate was 880 g terpolymer/(g palladium.hour).

EXAMPLE 12

A carbon monoxide/ethene/propene terpolymer was prepared in substantially the same way as in example 6, but with the following differences:
a) the catalyst solution contained 1,4-bis(di-n-butylphosphino)butane instead of 1,3-bis(diphenylphosphino)propane,
b) 12.3 g propene was introduced into the autoclave instead of 9.3 g, and
c) the gas mixture was forced in until a pressure of 55 bar was obtained instead of 40 bar.

5.8 g terpolymer was obtained. The polymerization rate was 1080 g terpolymer/(g palladium.hour).

EXAMPLE 13

A carbon monoxide/ethene/propene terpolymer was prepared in substantially the same way as in example 6, but with the following differences:
a) the catalyst solution contained 1,4-bis(methyl, n-butylphosphino)butane instead of 1,3-bis(diphenylphosphino)propane,
b) 12.2 g propene was introduced into the autoclave instead of 9.3 g, and
c) the gas mixture was forced in until a pressure of 55 bar was obtained instead of 40 bar.

6.4 g terpolymer was obtained. The polymerization rate was 2000 g terpolymer/(g palladium.hour).

EXAMPLE 14

A carbon monoxide/propene copolymer was prepared as follows. Into a stirred autoclave with a volume of 100 ml from which air had been driven by purging with nitrogen a catalyst solution was introduced consisting of:
40 ml methanol,
0.05 mmol palladium acetate,
0.055 mmol 1,3-b-bis(di-n-butylphosphino)propane, and
0.1 mmol para-toluenesulfonic acid.

After adding 10.7 g propene, the temperature was raised to 60° C., after which carbon monoxide was forced in until a pressure of 40 bar was reached. During the polymerization the pressure was kept constant by forcing in carbon monoxide. After 3 hours the polymerization was terminated by cooling the reaction mixture to room temperature and releasing the pressure. The polymer was isolated by evaporation of the reaction mixture.

2.5 g copolymer was obtained. The polymerization rate was 160 g copolymer/(g palladium.hour).

EXAMPLE 15

A carbon monoxide/propene copolymer was prepared in substantially the same way as in example 14, but with the following differences:
a) the catalyst solution contained 1,4-bis(di-n-butylphosphino)butane instead of 1,3-bis(di n-butylphosphino)propane, and
b) 8.4 g propene was introduced into the autoclave instead of 10.7 g.

6.1 g copolymer was obtained. The polymerization rate was 380 g copolymer/(g palladium.hour).

EXAMPLE 16

A carbon monoxide/propene copolymer was prepared in substantially the same way as in example 14, but with the following differences:
a) the catalyst solution contained 1,4-bis(di n-butylphosphino)butane instead of 1,3-bis(di-n-butylphosphino)propane,
b) 12.0 g propene was introduced into the autoclave instead of 10.7 g,
c) the reaction temperature was 90° C. instead of 60° C., and
d) the reaction time was 1 hour instead of 3 hours.

2.7 g copolymer was obtained. The polymerization rate was 510 g copolymer/(g palladium.hour).

EXAMPLE 17

A carbon monoxide/propene copolymer was prepared in substantially the same way as in example 14, but with the following differences:
a) the catalyst solution contained 1,4-bis(methyl, n-butylphosphino)butane instead of 1,3-bis(di-n-butylphosphino)propane,
b) 9.7 g propene was introduced into the autoclave instead of 10.7 g,
c) the reaction time was 3.2 hours instead of 3 hours.

8.2 g copolymer was obtained. The polymerization rate was 490 g copolymer/(g palladium.hour).

EXAMPLE 18

A carbon monoxide/propene copolymer was prepared in substantially the same way as in example 14, but with the following differences:
a) the catalyst solution contained 1,4-bis(methyl, n-butylphosphino)butane instead of 1,3-bis(di-n-butylphosphine)propane and 0.11 mmol perchloric acid instead of para-toluenesulfonic acid,
b) the catalyst solution also contained 1 ml trimethylorthoformiate,
c) 12.2 g propene was introduced into the autoclave instead of 10.7 g,
d) the reaction time was 1 hour instead of 3 hours.

4.1 g copolymer was obtained. The polymerization rate was 760 g copolymer/(g palladium.hour).

EXAMPLE 19

A carbon monoxide/propene copolymer was prepared in substantially the same way as in example 14, but with the following differences:
a) the polymerization was carried out in an autoclave with a volume of 300 ml instead of 100 ml,
b) a catalyst solution was used consisting of 120 ml methanol instead of 40 ml and 1,4-bis(methyl, n-butylphosphino)butane instead of 1,3-bis(di-n-butylphosphino)propane,
c) 27.0 g propene was introduced into the autoclave instead of 10.7 g,
d) the reaction temperature was 70° C. instead of 60° C., and
e) the reaction time was 1 hour instead of 3 hours.

6.4 g copolymer was obtained. The polymerization rate was 1190 g copolymer/(g palladium.hour).

EXAMPLE 20

A carbon monoxide/propene copolymer was prepared in substantially the same way as in example 14, but with the following differences:
a) the polymerization was carried out in an autoclave with a volume of 300 ml instead of 100 ml,
b) a catalyst solution was used consisting of:
120 ml methanol,
0.1 mmol palladium acetate,
0.11 mmol 1,3-bis(di-n-butylphosphino)propane, and
0.2 mmol para-toluenesulfonic acid,
c) 23.0 g propene was introduce into the autoclave instead of 10.7 g,
d) the reaction temperature was 80° C. instead of 60° C., and
e) the reaction time was 1 hour instead of 3 hours.

7.5 g copolymer was obtained. The polymerization rate was 710 g copolymer/(g palladium.hour).

Of the examples 1-20, examples 11-13 and 15-20 are according to the invention. In these examples carbon monoxide/propene copolymers and carbon monoxide/ethene/propene terpolymers were prepared using catalyst compositions containing a Group VIII metal and a phosphorus bidentate ligand with the general formula $(R_2)(R_4)P—R_3—P(R_2)(R_4)$. Examples 1-10 and 14 fall outside the scope of the invention and are included in the patent application for comparison.

Examples 1-5 relate to the preparation of carbon monoxide/ethene copolymers. Comparison of the results of these examples shows the decrease in polymerization rate that occurs if in the catalyst composition, a phosphorus bidentate ligand containing three atoms in the bridge connecting the two phosphorus atoms to each other is replaced by a phosphorus bidentate ligand containing four carbon atoms in the bridge. This applies both for a tetra-aryl- and tetra-alkylbisphosphine. On replacing a tetra-alkylbisphosphine in which the alkyl groups attached to phosphorus are identical with a tetra-alkylbisphosphine in which the alkyl groups attached to phosphorus differ in carbon number, a further decrease in the polymerization rate takes place.

Examples 6-10 relate to the preparation of carbon monoxide/ethene/propene terpolymers. Comparison of the results of examples 6-9 shows the decrease in polymerization rate that occurs if in the catalyst composition a tetra-arylbisphosphine containing three atoms in the bridge connecting the two phosphorus atoms to each other is replaced by a tetra-arylbisphosphine containing four carbon atoms in the bridge.

Comparison of the results of examples 10 and 11 and of the results of examples 14 and 15 shows the increase in polymerization rate that occurs both in the preparation of carbon monoxide/ethene/propene terpolymers and in the preparation of carbon monoxide/propene copolymers if in the catalyst composition a tetra-alkylbisphosphine containing three atoms in the bridge connecting the two phosphorus atoms to each other is replaced by a tetra-alkylbisphosphine containing four carbon atoms in the bridge.

Comparison of the results of examples 12 and 13 and of the results of examples 15 and 17 shows the increase in polymerization rate that occurs both in the preparation of carbon monoxide/ethene/propene terpolymers and in the preparation of carbon monoxide/propene copolymers if a tetra-alkylbisphosphine in which the alkyl groups attached to phosphorus are identical to each other are replaced by a tetra-alkylbisphosphine in which the alkyl groups attached to phosphorus differ in carbon number.

It was established by $^{13}$C-NMR analysis that the polymers prepared according to examples 1-20 were built up of linear chains in which the units from carbon monoxide on the one hand and the units from the olefins used on the other hand were present in an alternating arrangement. In the terpolymer chains the units from ethene and propene were present in a random distribution.

What is claimed is:

1. A catalyst composition useful in the preparation of a linear alternating polyketone polymer of carbon monoxide and at least one α-olefin of at least three carbon atoms comprising a Group VIII metal and a phosphorus bidentate ligand with the general formula

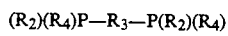

$(R_2)(R_4)P—R_3—P(R_2)(R_4)$ wherein $R_2$ is an optionally polar-substituted methyl group, $R_4$ is an optionally polar-substituted butyl group, and wherein $R_3$ is a divalent organic bridging group containing four carbon atoms and no two carbon atoms together form part of a single cyclic structure.

2. The catalyst composition according to claim 1 wherein the catalyst composition contains palladium as a Group VIII metal.

3. The catalyst composition according to claim 1, wherein the Group VIII metal is incorporated into the catalyst composition in the form of a salt of a carboxylic acid.

4. The catalyst composition according to claim 1 wherein the catalyst composition additionally contains an anion of an acid with a pKa of less than 4.

5. The catalyst composition according to claim 4 wherein the catalyst composition contains an anion of a sulfonic acid.

6. The catalyst composition according to claim 4 wherein the catalyst composition contains an anion of a halocarboxylic acid.

7. The catalyst composition according to claim 4 wherein the anion is present in a quantity of 100 mol per g. atom Group VIII metal.

8. The catalyst composition according to claim 1 wherein the catalyst composition additionally contains an organic oxidizing agent.

9. The catalyst composition according to claim 8 wherein said organic oxidizing agent comprises a 1,4-quinone.

10. The catalyst composition according to claim 1 wherein the catalyst composition contains the phosphorus bidentate ligand in a quantity of 0.5–2 mol per g.atom Group VIII metal.

11. The catalyst composition according to claim 1 wherein $R_3$ is a $CH_2CH_2CH_2CH_2$ group.

12. The catalyst composition according to claim 1 wherein the $R_2$ and $R_4$ groups each contain no more than 10 carbon atoms.

* * * * *